J. G. & B. B. CARMICHAEL.
BUTTER CUTTER.
APPLICATION FILED AUG. 10, 1908.
915,935.
Patented Mar. 23, 1909.
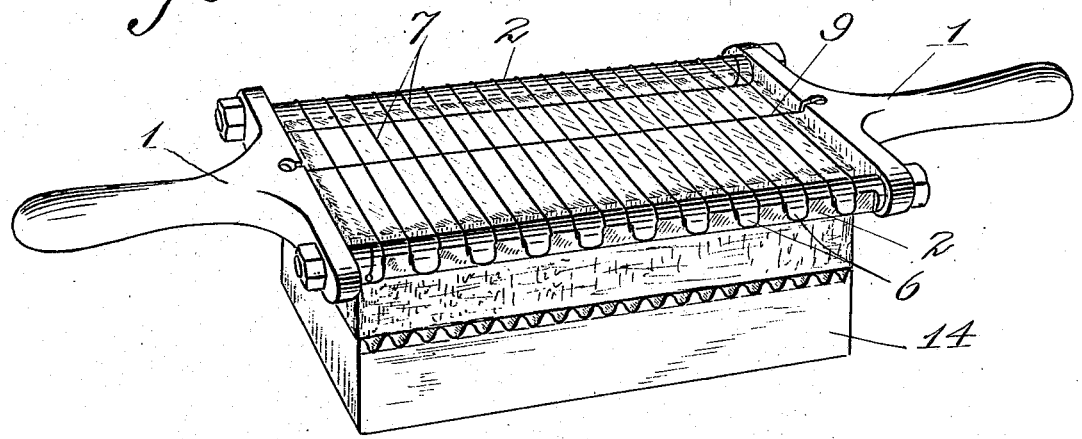
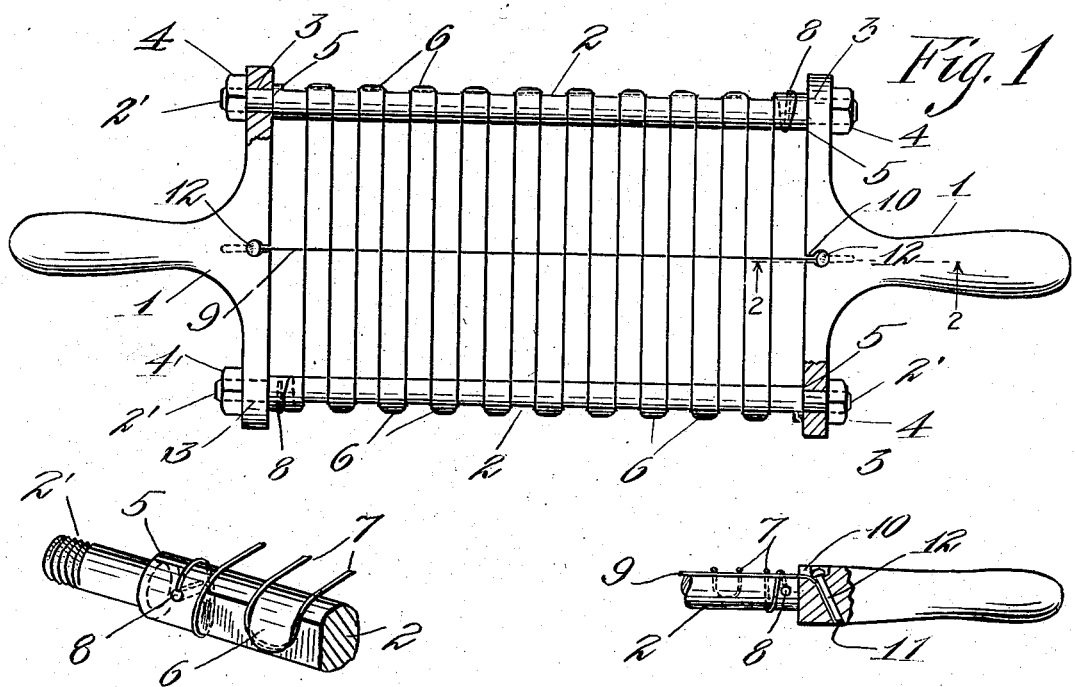
Witnesses
Roger Hovey.
Victor Gauntlett.
Inventors
J. G. Carmichael
B. B. Carmichael
By Adams & Brooks
Attorneys

UNITED STATES PATENT OFFICE.

JACOB G. CARMICHAEL AND BENJAMIN B. CARMICHAEL, OF SEATTLE, WASHINGTON, ASSIGNORS OF ONE-HALF TO JOHN N. SHAW, OF SEATTLE, WASHINGTON.

BUTTER-CUTTER.

No. 915,935.     Specification of Letters Patent.     Patented March 23, 1909.

Application filed August 10, 1908. Serial No. 447,886.

*To all whom it may concern:*

Be it known that we, JACOB G. CARMICHAEL and BENJAMIN B. CARMICHAEL, citizens of the United States of America, and residents of the city of Seattle, in the county of King and State of Washington, have invented certain new and useful Improvements in Butter-Cutters, of which the following is a specification.

The primary aim of the present invention is to provide an improved implement for dividing bricks of butter into comparatively small portions or pats.

The object of the invention is attained by certain novel features in the construction and arrangement of parts as hereinafter set forth and defined in the appended claims.

With reference to the accompanying drawing, wherein similar reference numerals designate corresponding parts throughout: Figure 1 is a plan view of our improved implement shown in partial section. Fig. 2 is a detail sectional view on line 2—2 of Fig. 1. Fig. 3 is a fragmentary perspective view showing a portion of one of the side members removed and the manner of securing the cross wire thereto. Fig. 4 is a transverse sectional view of one of the side members and Fig. 5 is a perspective view illustrating the device applied to a brick of butter in position for cutting.

In the practice of our invention T-shaped end members, as 1, and side members, as 2, are provided, the former having in the extremities of their head parts apertures 3 adapted to receive snugly but freely end portions, as 2′, of the side members. The outer extremities of portions 2′ are screw-threaded for engagement with nuts 4 which serve to bind the end members 1 firmly against shoulders 5 of the side members and thereby secure the latter from rotation and effect rigid connection of the frame parts. Members 2 preferably consist of round bars suitably grooved at their outer sides to provide lugs, as 6, which have their lower edges curved and undercut for suitable engagement with a wire 7, as clearly shown in Figs. 3 and 4. These lugs and the intervening spaces are all substantially equal in width but the lugs of one bar occupy like position to the spaces between the lugs of the other bar. By this construction a single section of wire, as 7, may be readily applied to the frame to provide a plurality of cutters extending in parallel relation and equally spaced one from another. The end portions of wire 7 are preferably each first wound around a respective side member 2, then inserted into apertures formed therein, (see Fig. 3) where they are firmly held by the insertion of suitable securing members 8, in the form of pins.

Reference numeral 9 indicates a cutter wire arranged transversely of wire 7 to produce a cut intersecting the cuts produced by the cutters formed by wire 7. The end portions of cutter wire 9 extend through curved grooves 10 and are arranged in inclined openings 11 formed in the end members 1. Pins 12 are fitted in openings 11 for holding wire 9 in position. By forming grooves 10 and openings 11 as stated, wire 9 can be drawn taut without having bearing against any sharp or abrupt projections on which it would be liable to be cut or injured, as will be readily understood. Wire 7 is obviously drawn taut before pins 8 are inserted to secure the same, the curved undercut lower edges of lugs 6 providing conveniently formed surfaces over which the wire can be drawn or withdrawn without fear of breaking. Should wire 7 become slack, it can if desired, be quickly tightened by rotating one or both of members 2.

In Fig. 5 we have illustrated our invention arranged over a brick of butter supported on a suitable base 14, in position to be lowered by the operator, whereupon the cutters provided by wires 7 and 9 will produce intersecting cuts and thereby divide the brick into pats.

Having thus described our invention, what we claim as new, and desire to secure by Letters Patent of the United States of America, is:

1. A butter cutter comprising a frame consisting of end and side members, said side members having threaded portions projecting through apertures formed in said end members, nuts on the projecting ends of the threaded portions of said side members, cutters extending across said frame, and handles on said frame.

2. A butter cutter comprising a frame consisting of end members formed with spaced apertures, and side members having extensions rotatably fitting in the apertures of said end members, means for holding said side and end members in fixed relation, lugs formed in spaced relation on said side members, and a wire extending back and forth across said frame to form cutters and being engaged with said lugs.

3. A butter cutter comprising a frame consisting of end members formed with spaced apertures, and side members having extensions rotatably fitting in the apertures of said end members, means for holding said side and end members in fixed relation, lugs having their under sides curved and undercut, and a wire extending back and forth across said frame to form cutters and being engaged with the curved undercut portions of said lugs.

4. A butter cutter comprising a frame consisting of side and end members, lugs on said side members arranged in spaced relation, said side members being formed in their end portions with apertures, a wire extending back and forth across said frame and engaged over said lugs, the end portions of said wire being arranged in the apertures in said side members, and pins fitted in the apertures of said side members preventing displacement of the end portions of said wire.

5. A butter cutter comprising a frame consisting of side and end members, said end members each formed with a curved groove and an angularly disposed aperture communicating therewith, cutters extending across said frame, a cutter extending across said first named cutters, said last named cutter consisting of a wire having its end portions extending through the grooves and arranged in the apertures of said end members, and pins fitted in the apertures of said end members for securing said last named cutter.

Signed at Seattle, Washington this 22d day of July 1908.

JACOB G. CARMICHAEL.
BENJAMIN B. CARMICHAEL.

Witnesses:
FRANK E. ADAMS,
A. A. BOOTH.